US010292109B2

(12) United States Patent
Doetsch et al.

(10) Patent No.: US 10,292,109 B2
(45) Date of Patent: May 14, 2019

(54) METHOD FOR COORDINATING AT LEAST ONE FIRST TRANSMISSION FROM A SINGLE-POINT TRANSMITTER TO A SINGLE-POINT RECEIVER AND AT LEAST ONE SECOND TRANSMISSION FROM A MULTIPOINT TRANSMITTER OR TO A MULTIPOINT RECEIVER IN A RADIO COMMUNICATION SYSTEM, NETWORK NODE AND MOBILE STATION THEREOF

(75) Inventors: Uwe Doetsch, Freudental (DE); Andreas Weber, Lehrensteinsfeld (DE); Thorsten Wild, Stuttgart (DE)

(73) Assignee: ALCATEL LUCENT, Nozay (FR)

( * ) Notice: Subject to any disclaimer, the term of this patent is extended or adjusted under 35 U.S.C. 154(b) by 793 days.

(21) Appl. No.: 14/241,621

(22) PCT Filed: Jul. 10, 2012

(86) PCT No.: PCT/EP2012/063479
§ 371 (c)(1),
(2), (4) Date: Feb. 27, 2014

(87) PCT Pub. No.: WO2013/029853
PCT Pub. Date: Mar. 7, 2013

(65) Prior Publication Data
US 2014/0233484 A1 Aug. 21, 2014

(30) Foreign Application Priority Data
Aug. 31, 2011 (EP) ..................................... 11306086

(51) Int. Cl.
*H04W 4/00* (2018.01)
*H04W 52/14* (2009.01)
(Continued)

(52) U.S. Cl.
CPC ....... *H04W 52/146* (2013.01); *H04J 11/0053* (2013.01); *H04L 5/0032* (2013.01);
(Continued)

(58) Field of Classification Search
CPC ............... H04W 52/146; H04W 16/12; H04W 72/0473; H04L 5/0032; H04L 5/0037; H04J 11/0053
See application file for complete search history.

(56) References Cited

U.S. PATENT DOCUMENTS

2008/0207150 A1    8/2008   Malladi et al.
2008/0280638 A1   11/2008   Malladi et al.
(Continued)

FOREIGN PATENT DOCUMENTS

CN    101217301 A    7/2008
CN    101800583 A    8/2010
(Continued)

OTHER PUBLICATIONS

Office Action of corresponding Taiwan Application No. 101128144, dated Jun. 24, 2014, 5 pages.
(Continued)

*Primary Examiner* — Yemane Mesfin
*Assistant Examiner* — Abdelillah Elmejjarmi
(74) *Attorney, Agent, or Firm* — Fay Sharpe LLP

(57) ABSTRACT

The invention relates to a method for coordinating at least one first transmission from a multipoint transmitter or to a multipoint receiver and at least one second transmission from a single-point transmitter to a single-point receiver in a radio communication system. The method comprises the step of reserving at least one first radio resource (SI-F1 to S3-F1, S9-F1, SI 0-F1, SI-F2, SI-F1 *b*-BW2 to SI 0-F1 *b*-BW2, SI-F2*b*-BW2) for the at least one first transmission for at least two serving areas of the radio communication
(Continued)

system and further reserving at least one second radio resource (S4-F1 to S8-F1, SI-F1 *b*-BW1 to SI 0-F1 *b*-BW1, SI-F2*b*-BW1, SI-F1 *b*-BW3 to SI 0-F1 *b*-BW3, SI-F2*b*-BW3) for the at least one second transmission for the at least two serving areas). The invention further relates to a network node (NS1, NS2) for coordinating at least one first transmission from a multipoint transmitter or to a multipoint receiver and at least one second transmission in a radio communication system and to a mobile station for use in a radio communication system.

14 Claims, 6 Drawing Sheets

(51) Int. Cl.
*H04J 11/00* (2006.01)
*H04L 5/00* (2006.01)
*H04W 72/04* (2009.01)
*H04W 16/12* (2009.01)

(52) U.S. Cl.
CPC ....... *H04L 5/0037* (2013.01); *H04W 72/0473* (2013.01); *H04W 16/12* (2013.01)

(56) References Cited

U.S. PATENT DOCUMENTS

| | | | |
|---|---|---|---|
| 2010/0081441 A1 | 4/2010 | Tao et al. | |
| 2010/0195599 A1 | 8/2010 | Zhang et al. | |
| 2010/0238984 A1 | 9/2010 | Sayana et al. | |
| 2010/0246705 A1 | 9/2010 | Shin et al. | |
| 2010/0273514 A1* | 10/2010 | Koo | H04B 7/024 455/501 |
| 2011/0013710 A1 | 1/2011 | Xiao | |
| 2011/0044296 A1 | 2/2011 | Zhang et al. | |
| 2011/0195735 A1* | 8/2011 | Irmer | H04W 52/346 455/509 |
| 2011/0269459 A1* | 11/2011 | Koo | H04W 24/10 455/434 |
| 2011/0294530 A1 | 12/2011 | Malladi et al. | |
| 2012/0127911 A1 | 5/2012 | Nishikawa et al. | |
| 2012/0172076 A1 | 7/2012 | Seki | |
| 2014/0038660 A1 | 2/2014 | Malladi et al. | |

FOREIGN PATENT DOCUMENTS

| | | |
|---|---|---|
| CN | 101940019 A | 1/2011 |
| EP | 1 143 635 A1 | 10/2001 |
| EP | 2 248 367 A1 | 11/2010 |
| EP | 2 448 338 A1 | 5/2012 |
| EP | 2 480 029 A1 | 7/2012 |
| JP | 2010-541300 A | 12/2010 |
| JP | 2011-9866 A | 1/2011 |
| JP | 2011-61728 A | 3/2011 |
| KR | 10-2009-0120487 A | 11/2009 |
| KR | 10-2010-0113137 A | 10/2010 |
| WO | 2009/099076 A1 | 8/2009 |
| WO | 2010/150807 A1 | 12/2010 |
| WO | 2011/017462 A2 | 2/2011 |
| WO | 2011/030561 A1 | 3/2011 |
| WO | WO2013029660 A1 * | 7/2013 ............ H04W 24/02 |

OTHER PUBLICATIONS

Panasonic, "Views on ICI handing for CoMP," $3^{rd}$ Generation Partnership Project (3GPP), 3GPP TSG RAN WG1 Meeting #56, R1-090685, 2 pages, XP050318557, Athens, Greece, Feb. 9-13, 2009.

Alcatel-Lucent et al., "Individual Setting of UL Open-loop Power Control for Heterogeneous Networks with Shared Cell-ID," $3^{rd}$ Generation Partnership Project (3GPP), 3GPP TSG RAN WG1 Meeting #66, R1-112423, pp. 1-5, XP050537837, Athens, Greece, Aug. 22-26, 2011.

Catt, "SRS Enhancements for LTE-A," $3^{rd}$ Generation Partnership Project (3GPP), 3GPP TSG RAN WG1 Meeting #60, R1-100893, 3 pages, XP050418495, San Francisco, US, Feb. 22-26, 2010.

International Search Report for PCT/EP2012/063479 dated Sep. 24, 2012.

"3rd Generation Partnership Project; Technical Specification Group Radio Access Network; Evolved Universal Terrestrial Radio Access (E-UTRA); Physical layer procedures, (Release 10)," 3GPP TS 36.213 V10.2.0 (Jun. 2011), Technical Specification, 120 pages.

"3rd Generation Partnership Project; Technical Specification Group Radio Access Network; Evolved Universal Terrestrial Radio Access (E-UTRA); Physical layer; Measurements, (Release 10)," 3GPP TS 36.214 V10.1.0 (Mar. 2011), Technical Specification, 13 pages.

Anil M. Rao, "Reverse Link Power Control for Managing Inter-cell Interference in Orthogonal Multiple Access Systems," Vehicular Technology Conference, 2007. VTC-2007 Fall. 2007 IEEE 66th, 5 pages.

Alcatel-Lucent Shanghai Bell, Alcatel Lucent, "Phase 2 CoMP evaluation results for full-buffer traffic," R1-112140, TSG-RAN WG1 #66, Athens, Greece, Aug. 22-26, 2011, Agenda Item: 6.5.1, 16 pages.

* cited by examiner

METHOD FOR COORDINATING AT LEAST ONE FIRST TRANSMISSION FROM A SINGLE-POINT TRANSMITTER TO A SINGLE-POINT RECEIVER AND AT LEAST ONE SECOND TRANSMISSION FROM A MULTIPOINT TRANSMITTER OR TO A MULTIPOINT RECEIVER IN A RADIO COMMUNICATION SYSTEM, NETWORK NODE AND MOBILE STATION THEREOF

FIELD OF THE INVENTION

The invention relates to radio communication and, more particularly but not exclusively, to coordinating at least one first transmission from a multipoint transmitter or to a multipoint receiver and at least one second transmission from a single-point transmitter to a single-point receiver in a radio communication system.

BACKGROUND

Similar to a soft handover in UMTS (UMTS=Universal Mobile Telecommunication Systems), CoMP transmissions (CoMP=Cooperative Multipoint) and CoMP receptions are effective transmission and reception schemes for obtaining an overall performance gain in radio communication systems such as LTE (LTE=Long Term Evolution). Thereby, the overall data rate can be increased without requiring additional frequency spectrum or without requiring an increase of transmit power. Especially users, that are located at the border between two radio cells or two radio sectors can benefit from CoMP transmissions and/or CoMP receptions.

CoMP transmission means a transmission of downlink data from a multipoint transmitter (e.g. two or more antenna systems of one or several base stations, which transmit same data) of a radio communication system to a mobile station. CoMP reception means a reception of uplink data at a multipoint receiver (e.g. two or more antenna systems of one or several base stations, which receive same data from a transmitter) of a radio communication system, which have been transmitted by a mobile station.

A radio communication system is operated usually at a specific IoT operational point (IoT=interference over thermal noise). The IoT is defined to be the total received interference power at a radio cell divided by the thermal noise power. The interference power consists of thermal noise plus the received power from all mobile station transmissions in other radio cells. For single-point to single-point transmissions from a mobile station to a single antenna system of the radio communication system, an IoT operational point of the radio communication system is much lower than an IoT operational point of a radio communication system in a CoMP mode. This means, that a mobile station transmitting for example in an uplink CoMP mode must be operated with different power control parameters than a further mobile station not transmitting in the uplink CoMP mode but transmitting uplink data by a single-point to single-point transmission. In a single-point to single-point transmission one or several antenna elements of an antenna system at the transmitter and one or several antenna elements of an antenna system at the receiver may be applied. Simultaneously operating a radio communication system with a first group of mobile stations operating in the uplink CoMP mode and a second group of mobile stations not operating in the uplink CoMP mode may degrade a performance and coverage area for mobile stations of the second group by using the high IoT operational point and reduces the overall performance by using the low IoT operational point.

SUMMARY

The way of serving in a radio communication system simultaneously a first group of mobile stations by a CoMP mode and a second group of mobile stations by single-point to single-point transmissions sets high demands on reducing disturbance on mobile stations of the second group and on increasing the overall performance of the radio communication system.

Therefore, objects of the invention are to eliminate the disturbance of mobile stations in the second group and to increase the overall performance of the radio communication system, which simultaneously provides transmissions in a CoMP mode and further transmissions by a single-point to single-point mode.

The object is achieved by a method for coordinating at least one first transmission from a multipoint transmitter or to a multipoint receiver and at least one second transmission from a single-point transmitter to a single-point receiver in a radio communication system, which comprises the step of reserving at least one first radio resource for the at least one first transmission for at least two serving areas of the radio communication system and further reserving at least one second radio resource for the at least one second transmission for the at least two serving areas.

The single-point transmitter may be for example a mobile station with an antenna system that comprises one or several antenna elements or may be a single antenna system of the radio communication system with one or several antenna elements. Similarly, the single-point receiver may be for example a mobile station with one or several antenna elements or may be a single antenna system of the radio communication system with one or several antenna elements.

The at least two serving areas may be for example at least two radio cells or at least two radio sectors or a mixture of radio cells and radio sectors.

The at least one first radio resource or the at least one second radio resource may be for example a time resource, a frequency resource, or a combination of the time resource and the frequency resource.

The time resource may be for example one or several sub-frames of a radio frame or the frequency resource may be for example one or several frequency subcarrier blocks.

The at least one first transmission may be for example one or several cooperative multipoint transmissions of downlink data from at least two antenna systems of one or several base stations of the radio communication system to one or several mobile stations and/or one or several cooperative multipoint receptions of uplink data at two or more antenna systems of one or several base stations of the radio communication system, which have been transmitted by one or several mobile stations.

The object is further achieved by a network node for coordinating at least one first transmission from a multipoint transmitter or to a multipoint receiver and at least one second transmission from a single-point transmitter to a single-point receiver in a radio communication system. The network node may be for example a base station or a network server.

The method according to the present invention offers a first benefit of solving a problem of coexistence of mobile stations in the CoMP mode and further mobile stations in a single-point to single-point transmission mode.

The method according to the present invention offers a second benefit of increasing the overall performance of the radio communication system.

The method also offers a third benefit of eliminating or reducing a detrimental influence by mobile stations in the CoMP mode on performance and coverage of mobile stations in the single-point to single-point transmission mode.

The method offers a fourth benefit of providing a simple separation of mobile stations in the CoMP mode and further mobile stations in the single-point to single-point transmission mode. This simple separation does not require any additional coordination or radio resources for each individual first or second transmission.

In a preferred embodiment, the method further comprises the steps of receiving from at least one base station of the radio communication system status information of the at least one base station, determining a first size of the at least one first radio resource for the at least one first transmission, determining a second size of the at least one second radio resource for the at least one second transmission, and determining a cooperation area comprising the at least two serving areas based on the received status information, and transmitting radio resource information of at least one of the reserved at least one first radio resource or of the reserved at least one second radio resource to at least one base station serving the cooperation area.

According to a further preferred embodiment, the method further comprises the steps of predefining at least one first power control parameter for the at least one first transmission, predefining at least one second power control parameter for the at least one second transmission, transmitting the predefined at least one first power control parameter and the predefined at least one second power control parameter to at least one mobile station, storing the predefined at least one first power control parameter and the predefined at least one second power control parameter at the at least one mobile station, transmitting an indication indicating the at least one first radio resource or the at least one second radio resource to the at least one mobile station, and applying at the at least one mobile station the predefined at least one first power control parameter for the at least one first radio resource or the predefined at least one second power control parameter for the at least one second radio resource based on the received indication. This provides the benefit, that these parameters and indications must be only transmitted once to the at least one mobile station and further transmissions are not required, if the at least one mobile station switches several times between the at least one first transmission and the at least one second transmission.

In an even further preferred embodiment, the predefined at least one first power control parameter and the predefined at least one second power control parameter are transmitted in a broadcast. Thereby, only a single message is transmitted to all mobile stations currently residing in a service area such as a radio cell or a radio sector and fewer radio resources for signaling are required.

In a further preferred embodiment, the indication for the at least one uplink transmission is included in an uplink resource grant. This provides a first benefit of not requiring an additional signaling message, which tells the at least one mobile station, which of the stored power control parameter sets shall be used for the next uplink transmissions. It provides a second benefit of allowing an easy switching between the first transmission and the second transmission from one uplink resource grant to a next uplink resource grant.

According to an even further preferred embodiment, one of the predefined at least one first power control parameter and the predefined at least one second power control parameter is transmitted as an absolute value and a further one of the predefined at least one first power control parameter and the predefined at least one second power control parameter is transmitted as a difference value with respect to the absolute value. This allows to apply fewer resources such as digital bits for transmitting the further one of the predefined at least one first power control parameter and the predefined at least one second power control parameter.

Preferably, the status information may comprise data traffic related information and/or mobile station related information and/or base station related information.

The data traffic related information may comprise for example information of an amount of data traffic pending at one or several mobile stations and/or information of one or several service types of the pending traffic.

The mobile station related information may comprise for example information of velocity of at least one mobile station served by the at least one base station and/or information of a signal-to-interference and noise ratio of uplink signals received from the at least one mobile station and/or information of power headroom of the at least one mobile station.

The base station related information may comprise for example information of processing capacity of the at least one base station for the at least one first transmission and/or information of a traffic capacity on at least one backhaul interface of the at least one base station and/or information of a predicted performance gain at the at least one base station, if a ratio of the first size of the at least one first radio resource and the second size of the at least one second radio resource would be changed and/or information of a current capacity utilization of the at least one first radio resource and/or the at least one second radio resource at the at least one base station.

According to a further preferred embodiment, the reservation of the at least one first radio resource and the reservation of the at least one second radio resource is performed, if a number of mobile stations receiving the at least one first transmission mode or applying the at least one first transmission exceeds a predefined threshold. Thereby, it can be avoided that radio resources are reserved for a CoMP mode for a specific time and cannot flexibly be used for single-point to single-point transmissions.

Further advantageous features of the invention are defined and are described in the following detailed description of the invention.

BRIEF DESCRIPTION OF THE FIGURES

The embodiments of the invention will become apparent in the following detailed description and will be illustrated by accompanying figures given by way of non-limiting illustrations.

DESCRIPTION OF THE EMBODIMENTS

Figure 1:
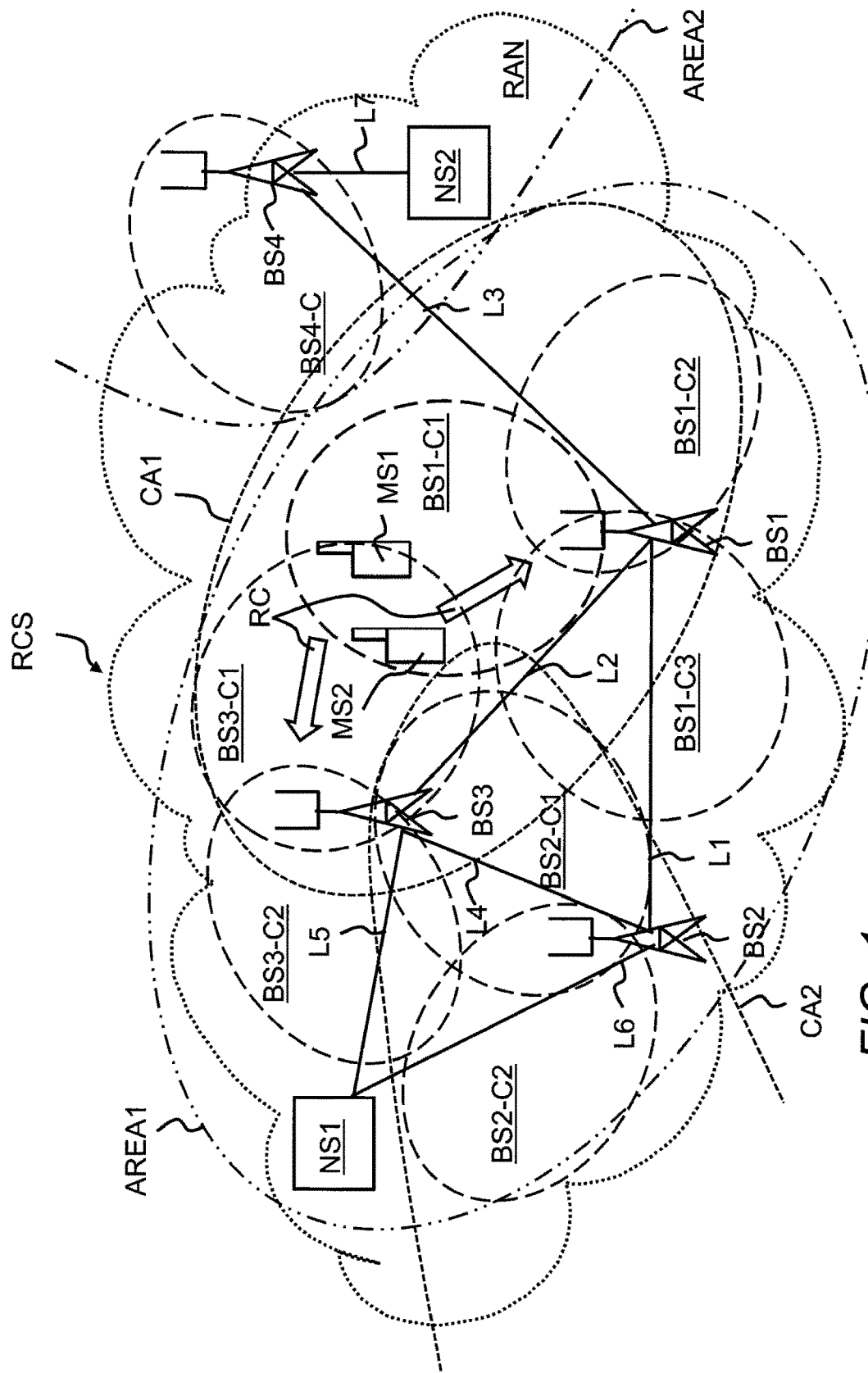
FIG. 1 shows schematically a block diagram of network nodes of a radio communication system.

FIG. 1 shows a radio communication system RCS, that comprises a radio access network RAN. The core network of the radio communication system RCS and connections of the radio communication system RCS to further radio communication systems, to the Internet or to fixed line communications systems are not shown for simplification.

The radio communication system RCS may be for example a 3GPP LTE radio communication network using OFDM (OFDM=Orthogonal Frequency Division Multiplexing). In further alternatives, the radio communication system RCS may be for example a WiMAX radio communication network (WiMAX=Worldwide Interoperability for Microwave Access) based on the IEEE 802.16 standard family (IEEE=Institute of Electrical and Electronics Engineers), or a WLAN (WLAN=Wireless Local Area Network) based on the IEEE 802.11 standard family.

The radio access network RAN comprises exemplarily four base stations BS1, BS2, BS3 and BS4. The term "base station" may be considered synonymous to and/or referred to as a base transceiver station, Node B, enhanced Node B, access point etc. and may describe equipment that provides wireless connectivity via one or more radio links to one or more mobile stations.

The radio access network RAN may further comprise two network servers NS1, NS2. The term "network server" may be considered synonymous to and/or referred to as any computer that provides various shared resources to the four base stations BS1 to BS4 and may be also to network nodes of the core network of the radio communication system RCS. The shared resources can include disk space, hardware access, and software resources.

A first network server NS1 may control a first predefined area AREA1, which comprises a first base station BS1, a second base station BS2 and a third base station BS3 and a second network server NS2 may control a second predefined area AREA2, which comprises a fourth base station BS4.

In an alternative, the first network server NS1 and the second network server NS2 may be part of the core network of the radio communication system RCS.

The base stations BS1 to BS3 may be assigned to the first predefined area AREA1 and the fourth base station BS4 may be assigned to the second predefined area AREA2 for example by an operation and maintenance centre, which is not shown in FIG. 1 for simplification.

In a further alternative, functionality of the first network server NS1 as described later on may be provided by one of the base stations BS1, BS2 or BS3 of the first predefined area AREA1 and functionality of the second network server NS2 may be provided by the fourth base station BS4 of the second predefined area AREA2.

According to an even further alternative, the radio access network RAN may comprise only a single predefined area, which means, that the predefined area may be identical an overall area that is covered by the radio access network RAN.

Network connections L1, L2, L3, L4, L5, L6 and L7 may connect the base stations BS1 to BS4 and the network servers NS1, NS2.

The network connections L1, L2, L3, and L4 between the base stations BS1 to BS4 may be for example based on the X2 interface such as used in 3GPP LTE.

Further predefined areas, further base stations, further network servers, further network connections connecting the further base stations and the further network servers and network connections between the radio access network RAN and the core network of the radio communication system RCS are not shown for simplification.

The first base station BS1 may provide wireless coverage for example for three radio cells BS1-C1, BS1-C2 and BS1-C3. The second base station BS2 may provide wireless coverage for example for two radio cells BS2-C1 and BS2-C2. The third base station BS3 may provide wireless coverage for example for two radio cells BS3-C1 and BS3-C2. The fourth base station BS4 may provide wireless coverage for a single radio cell BS4-C. The term "radio cell" may be considered synonymous to and/or referred to as cell, radio sector, sector etc.

A first mobile station MS1 and a second mobile station MS2 may be located in an overlap region of a first radio cell BS1-C1 of the first base station BS1 and of a first radio cell BS3-C1 of the third base station BS3. Further mobile stations are not shown for simplification.

The term "mobile station" may be considered synonymous to, and may hereafter be occasionally referred to, as a mobile unit, mobile user, access terminal, user equipment, subscriber, user, remote station etc. The mobile station RAN1-MS may be for example a cellular telephone, a portable computer, a pocket computer, a hand-held computer, a personal digital assistant or a car-mounted mobile device.

A coordination of single-point to single-point transmissions and of cooperative multipoint transmissions and/or cooperative multipoint receptions in the radio communication system RCS may comprise for example a predefined reservation of one or several first radio resources for one or several cooperative multipoint transmissions and/or for one or several cooperative multipoint receptions and a predefined reservation of one or several second radio resources for one or several single-point to single-point transmissions.

The coordination of the single-point to single-point transmissions and of the cooperative multipoint transmissions and/or cooperative multipoint receptions may further comprise a predefinition of one or several first power control parameters for the one or several cooperative multipoint transmissions and/or multipoint receptions and a further predefinition of one or several second power control parameters for the one or several single-point to single-point transmissions.

The first base station BS1 may transmit status information to the first network server NS1. The status information may comprise data traffic related information and/or mobile station related information and/or base station related information. Similarly, the base stations BS2 and BS3 may transmit status information to the first network server NS1 and the fourth base station BS4 may transmit status information to the second network server NS2. The data traffic related information, the mobile station related information and the base station related information will be explained in more detail later on.

The first network server NS1 may analyze the status information received from the base stations BS1 to BS3 and may reserve one or several first radio resources of a radio channel RC of the radio communication system RCS for one or several cooperative multipoint transmissions and/or receptions in a first cooperation area CA1 and may reserve one or several second radio resources of the radio channel RC for one or several single-point to single-point transmissions in the first cooperation area CA1 such as a transmission from radio cell BS3-C1 to the first mobile station MS1 or a further transmission from the second mobile station MS2 to the radio cell BS1-C1. The first cooperation area CA1 may comprise the first radio cell BS1-C1 of the first base station BS1 and the first radio cell BS3-C1 of the third base station BS3 such as shown in FIG. 1. The radio channel RC may be for example an uplink channel from the mobile stations MS1, MS2 towards the base stations BS1, BS3 of the radio access network RAN. In a further alternative, the radio channel RC may be a downlink channel from the base stations BS1, BS2 towards the mobile stations MS1, MS2.

The first cooperation area CA1 may comprise one or several cooperation sets. A cooperation set is also called a CoMP cluster and comprises a group of antenna systems of the radio communication system RCS, which cooperate for a cooperative transmission or joint transmission of downlink data to one or several mobile stations or for cooperative reception or joint reception of uplink data from one or several mobile stations. The radio cells BS1-C1 and BS3-C1 may be for example a first CoMP cluster of the first cooperation area CA1 and radio cells BS1-C1 and BS1-C2 may be a second CoMP cluster of the first cooperation area CA1.

The first network server NS1 may transmit radio resource information of the reserved one or several first radio resources and the reserved one or several second radio resources to the first base station BS1 and the third base station BS3 of the first cooperation area CA1.

A second cooperation area CA2 may comprise the first radio cell BS2-C1 and the second radio cell BS2-C2 of the second base station BS2 such as shown in FIG. 1. Further cooperation areas of the radio access network RAN are not shown for simplification.

The first network server NS1 may determine same or different first radio resources and second radio resources for the first cooperation area CA1 and the second cooperation area CA2 dependent for example on a load situation and a distribution of mobile stations within the first cooperation area CA1 and the second cooperation area CA2.

Figure 2:
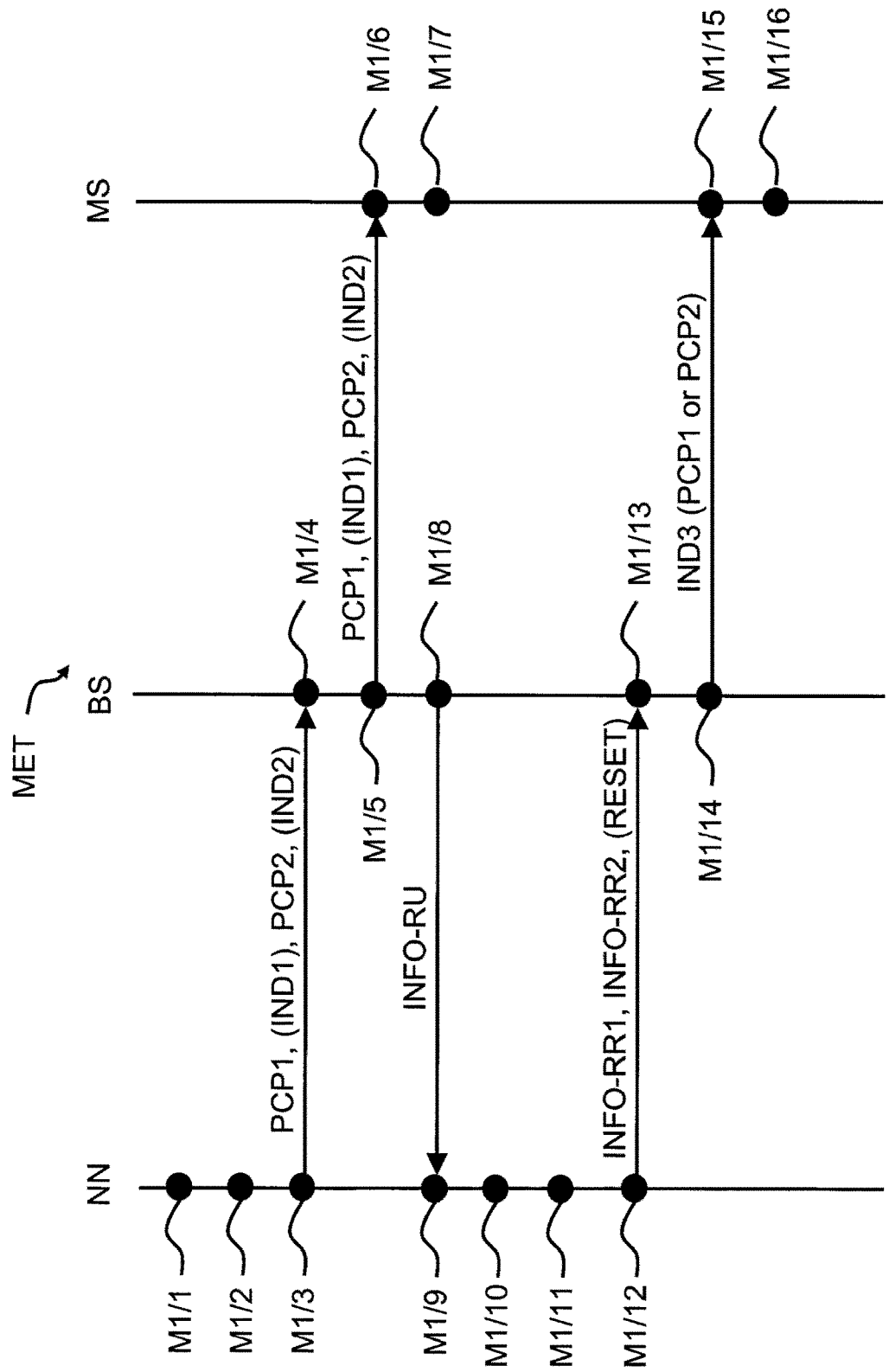
FIG. 2 shows exemplarily a flow diagram of a method executed by the network nodes of the radio communication system.
Figure 3:
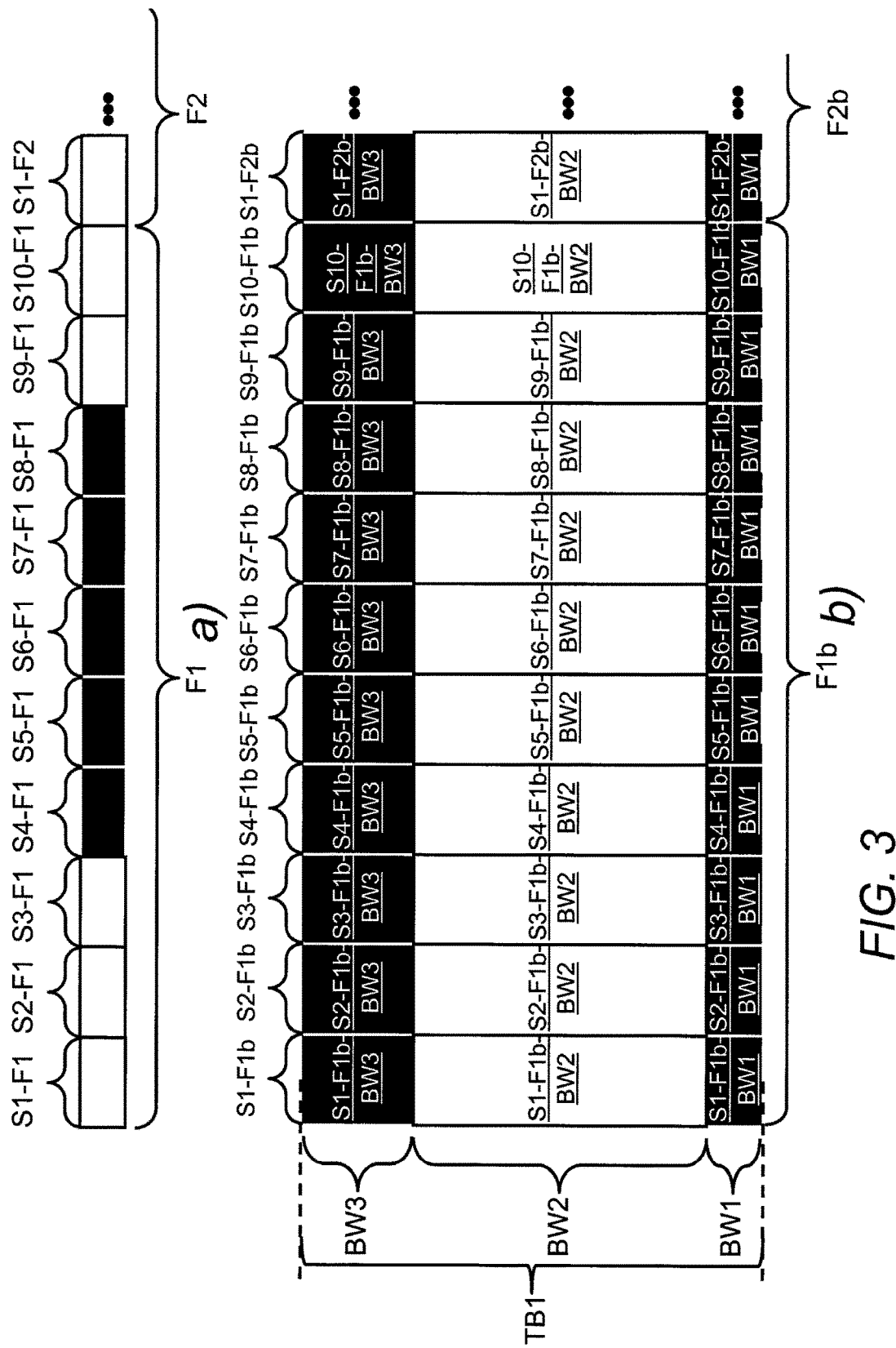
FIG. 3 shows exemplarily two possibilities of a simultaneous reservation of radio resources for transmissions with a multipoint transmitter or a multipoint receiver and for single-point to single-point transmissions.
Figure 4:
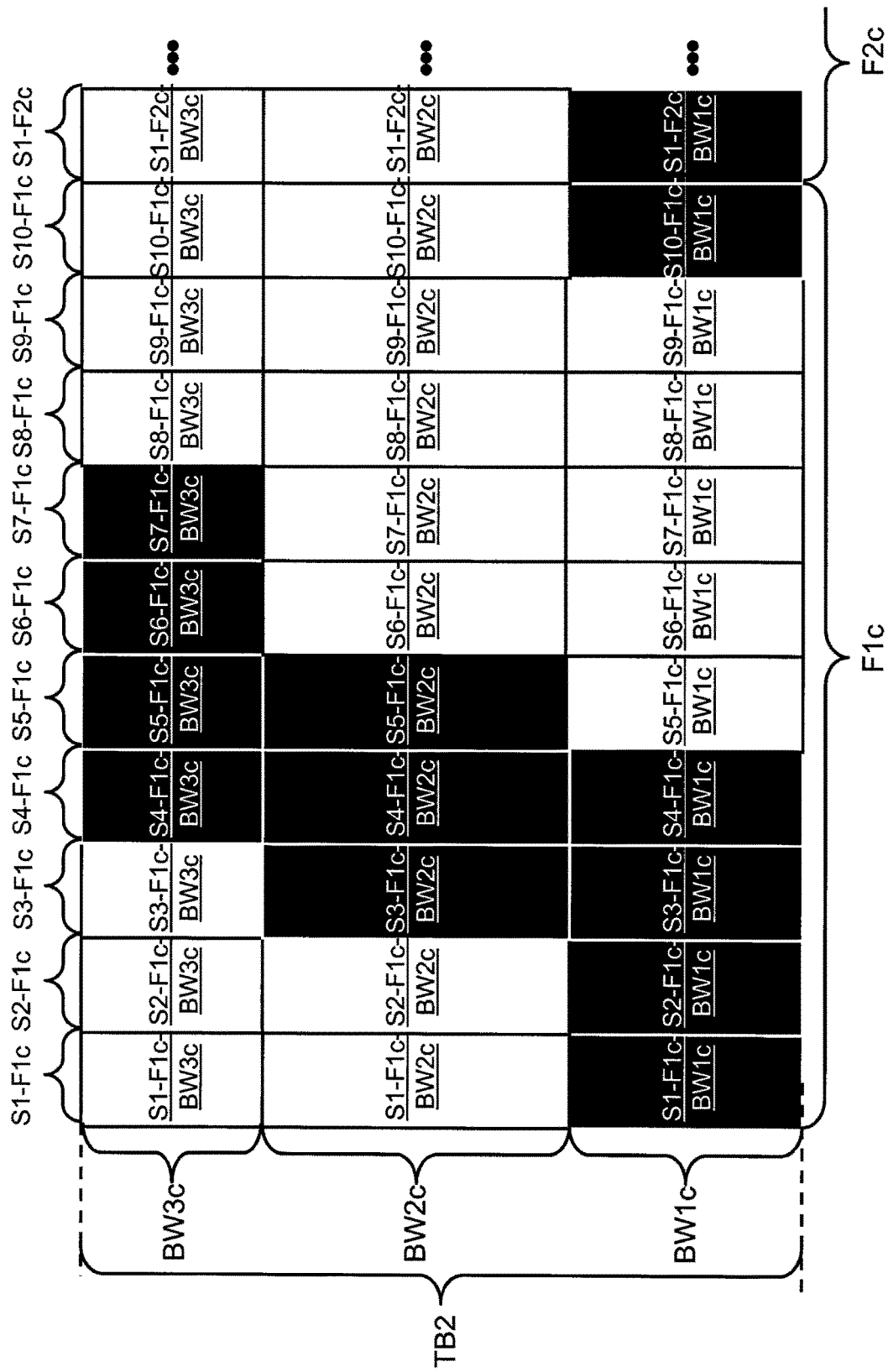
FIG. 4 shows exemplarily a further possibility of a simultaneous reservation of radio resources for transmissions with a multipoint transmitter or a multipoint receiver and for single-point to single-point transmissions.

More details according to the coordination of the single-point to single-point transmissions and the cooperative multipoint transmissions and/or the cooperative multipoint receptions in the radio communication system RCS are given with respect to FIGS. 2 to 4 and their corresponding description.

Referring to FIG. 2 a flow diagram of a method MET in accordance to the embodiments of the invention is shown. The number of the steps for performing the method MET is not critical, and as can be understood by those skilled in the art, that the number of the steps and the order of the steps may vary without departing from the scope of the invention.

For example steps M1/1 and M1/2 may be executed temporal in parallel to step M1/11 and steps M1/3 and M1/4 may be executed temporal in parallel to steps M1/12 and M1/13.

The method MET is described in the following exemplarily for a coordination of first uplink transmissions from one or several of the mobile stations MS1, MS2 to a multipoint receiver comprising two or more antenna systems of the radio communication system RCS and of second uplink transmissions from one or several of the mobile stations MS1, MS2 to a single antenna system of the radio communication system RCS. As can be understood by those skilled in the art, a similar method may be applied for a coordination of first downlink transmissions from two or more antenna systems of the radio communication system RCS to one or several of the mobiles stations MS1, MS2 and of second downlink transmissions from a single antenna system of the radio communication system RCS to one or several mobile stations MS1, MS2.

The flow diagram is shown between a network node NN, a base station BS and a mobile station MS.

The network node NN may be for example the first network server NS1 or the second network NS2 shown in FIG. 1. In an alternative, the network node NN may be one of the base stations BS1 to BS4 shown in FIG. 1.

If the network node NN is one of the network servers NS1, NS2, the base station BS is one of the base stations BS1 to BS4. If the network node NN is one of the base stations BS1 to BS4, the base station BS is a different one of the base stations BS1 to BS4.

The mobile station MS may be for example the first mobile station MS1 or the second mobile station MS2 shown in FIG. 1.

In a first step M1/1, the network server NS may predefine the one or several first power control parameters for the one or several cooperative multipoint receptions.

As opposed to 3G radio communication systems such as UMTS in which the mobile stations MS1, MS2 always use the entire transmission bandwidth, in LTE uplink resources can be assigned as a fraction of a total transmission bandwidth. A smallest uplink resource is a so-called physical resource block and has a bandwidth of 180 KHz. Therefore, in OFDM radio communication systems such as 3GPP LTE it is more appropriate to control a mobile station's PSD (PSD=power spectral density) rather than controlling an absolute power of the mobile station. A transmit PSD of a mobile station can be defined for example in case of 3GPP LTE as a transmit power per physical resource block.

A transmit power of the mobile station MS1 or MS2 for an uplink transmission via an uplink channel such as PUSCH (PUSCH=physical uplink shared channel) as defined in 3GPP LTE or in 3GPP LTE Advanced varies as a function of physical resource blocks, which are simultaneously be assigned to the mobile station, as described by following equation:

$$P_{PUSCH,c}(i) = N \cdot P_{PUSCH,c,PRB}(i) \quad (1)$$

where:
$P_{PUSCH,c}(i)$: transmit power of the mobile station in subframe i for serving cell c,
N: number of simultaneously assigned physical resource blocks,
$P_{PUSCH,c,PRB}(i)$: transmit power of the mobile station in the subframe i for the serving cell c per physical resource block.

The transmit power of the mobile station MS1 or MS2 may be calculated for example by following equation, which is based on an equation given on page 9 of the standard document 3GPP TS 36.213 V10.2.0, section 5.1.1:

$$P_{PUSCH,c}(i) = \min\left\{ \begin{array}{c} P_{CMAX,c}(i), \\ 10\log_{10}(M_{PUSCH,c}(i)) + P_{O\_PUSCH,c}(j) + \alpha_c(j) \cdot PL_c + \\ \Delta_{TF,c}(i) + f_c(i) \end{array} \right\} [dBm] \quad (2)$$

where:
- $P_{CMAX,c}(i)$: configured maximum transmit power of the mobile station in the subframe i for the serving cell c, for example, 23 dBm,
- $M_{PUSCH,c}(i)$: bandwidth of a PUSCH resource assignment expressed in number of the physical resource blocks valid for the subframe i and the serving cell c,
- $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for the serving cell c (for more details see 3GPP TS 36.213 V10.2.0, section 5.1.1.1), parameter j allows for a differentiation between different types of uplink transmission: semi-persistent (e.g. for VoIP) and dynamically scheduled resources, and random access resources,
- $\alpha_c$ may be a 3-bit parameter provided by higher layers for the serving cell c,
- $PL_c$ is a downlink pathloss estimate calculated in the mobile station MS1 or MS2 for the serving cell c in dB (for more details see 3GPP TS 36.214 V10.1.0, section 5.1.1.1),
- $\Delta_{TF,c}(i)=10\log_{10}((2^{BPRE \cdot K_s}-1) \cdot \beta_{offset}^{PUSCH})$ for $K_S=1.25$ and 0 for $K_S=0$ where $K_S$ is given by a parameter deltaMCS-Enabled provided by higher layers for each serving cell c, $K_S=0$ for transmission mode 2, (for more details regarding BPRE and $\beta_{offset}^{PUSCH}$ see 3GPP TS 36.213 V10.2.0, section 5.1.1.1),
- $f_c(i)$: current PUSCH power control adjustment state for the serving cell c (for more details see 3GPP TS 36.213 V10.2.0, section 5.1.1.1).

A first IoT value such as for example 15 dB may be predefined for the uplink CoMP mode and a second IoT value such as for example 5 dB may be predefined for the one or several uplink single-point to single-point transmissions. The first IoT value and the second IoT value may be predefined by the network server NS. A fulfillment of the first predefined IoT value and the second predefined IoT value may be periodically checked by performing measurements at the first base station BS1 and the third base station BS3 of the first cooperation area CA1 and by averaging the measurements over a predefined averaging time.

A first $P_{O\_PUSCH,c}(j)$ parameter may be predefined as a single first power control parameter for the uplink CoMP mode and may be iteratively adapted to keep the first predefined IoT value for the uplink CoMP mode over the predefined averaging time. Similarly, a second $P_{O\_PUSCH,c}(j)$ parameter may be predefined as a single second power control parameter for the one or several uplink single-point to single-point transmissions and may be iteratively adapted to keep the second predefined IoT value for the one or several uplink single-point to single-point transmissions over the predefined averaging time.

If for example the first predefined IoT value is exceeded for a predefined time (e.g. the predefined averaging time) in a specific radio cell such as the radio cell BS3-C1, an overload indicator may be transmitted from the third base station BS3 to the first base station BS1. Receiving the overload indicator will trigger the first base station BS1 to reduce iteratively the first predefined $P_{O\_PUSCH,c}(j)$ parameter until no further overload indicator is received from the third base station BS3.

In further alternatives, a set of first power control parameters such as the $P_{O\_PUSCH,c}(j)$ parameter and/or the 3-bit parameter $\alpha_c$ and/or the parameter deltaMCS-Enabled and/or a parameter pathlossReferenceLinking for configuring the higher layer filtered RSRP and/or a parameter Accumulation-enabled for enabling accumulation such as defined in 3GPP TS 36.213 V10.2.0, section 5.1.1.1 may be predefined by the network server NS for the uplink CoMP mode.

In even further alternatives, the single first power control parameter or the set of first power control parameters may be predefined by one of the base stations BS1 to BS3 for the first predefined area AREA1 and by the fourth base station BS4 for the second predefined area AREA2.

Similarly in a further step M1/2, the first network server NS1 or one of the base station BS1 to BS3 for the first predefined area AREA1 and the second network server NS2 or the fourth base station BS4 for the second predefined area AREA2 may predefine the one or several second power control parameters for the one or several single-point to single-point transmissions. Therefore, same equation (2) may be applied and the second power control parameter may be also the $P_{O\_PUSCH,c}(j)$ parameter.

As an alternative for the equation (2) following equation from Anil M. Rao "Reverse Link Power Control for Managing Inter-Cell Interference in Orthogonal Multiple Access Systems", Vehicular Technology Conference, 2007. VTC-2007 Fall. 2007 IEEE 66th (see equation (1)) may be applied by the mobile stations MS1 and MS2 for calculating their transmit power:

$$P_{PUSCH,c}(i)=\min(P_{CMAX,c}(i), \Phi + I_{serving} + PL_c)[\text{dBm}] \quad (3)$$

where:
- $\Phi$: target SINR (SINR=Signal to Interference-plus-Noise Ratio),
- $I_{serving}$: broadcast average reverse link interference PSD.

In such case, a single first power control parameter may be for example the $I_{serving}$ parameter for the CoMP uplink mode, which may be iteratively adapted to keep the first predefined IoT value for the uplink CoMP mode over the predefined averaging time and a single second power control parameter may be for example also the $I_{serving}$ parameter for the one or several single-point to single-point transmissions, which may be iteratively adapted to keep the second predefined IoT value for the one or several uplink single-point to single-point transmissions over the predefined averaging time.

According to a further alternative, the operation and maintenance centre of the radio communication system RCS may predefine the one or several first power control parameters and the one or several second power control parameters for the first predefined area AREA1 and the second predefined area AREA2.

In a next step M1/3, the network server NS may transmit the one or several predefined first power control parameters PCP1 and the one or several predefined second power control parameters PCP2 to the base station BS, which may be located within the predefined area AREA1, AREA2. The base station BS may receive the one or several predefined first power control parameters PCP1 and the one or several predefined second power control parameters PCP2 in a further step M1/4.

In an alternative, the network server NS may further transmit a first indication IND1, which indicates the one or several predefined first power control parameters as power control parameters for transmissions in the uplink CoMP mode, and may further transmit a second indication IND2, which indicates the one or several predefined second power control parameters as power control parameters for the uplink single-point to single-point transmissions.

The steps M1/1 to M1/4 may be executed by a self-configuration algorithm, if the radio communication system RCS is going to be installed or by a self-optimization algorithm, if the network performance of the radio communication system RCS is going to be optimized.

In a further step M1/5, the base station BS transmits the one or several predefined first power control parameters PCP1 and the one or several predefined second power control parameters PCP2 to the mobile station MS by a dedicated transmission.

In an alternative, the base station may further transmit the first indication IND1 and the second indication IND2 to the mobile station MS.

The mobile station MS may receive the one or several predefined first power control parameters PCP1 and the one or several predefined second power control parameters PCP2 in a next step M1/6.

In an alternative, the base station BS transmits the one or several predefined first power control parameters PCP1 and the one or several predefined second power control parameters PCP2 to the mobile station MS in a broadcast to several mobile stations MS1, MS2.

Preferably, the predefined at least one first power control parameter or the predefined at least one second power control parameter such as the $P_{O\_PUSCH,c}(j)$ parameter is transmitted as an absolute value and the corresponding parameter of the complementary transmission mode may be transmitted as a difference value $\Delta P_0$ with respect to the absolute value by using for example following equation:

$$\Delta P_0 = P_{0\_PUSCH,c,CoMP}(j) - P_{0\_PUSCH,c,Non-CoMP}(j) \quad (4)$$

where:
$P_{0\_PUSCH,c,CoMP}(j)$: value of parameter $P_{0\_PUSCH,c}(j)$ for the transmission in the uplink CoMP mode,
$P_{0\_PUSCH,c,Non-CoMP}(j)$: value of parameter $P_{0\_PUSCH,c}(j)$ for the uplink single-point to single-point transmissions.

In a further step M1/7, the mobile station MS stores the one or several predefined first power control parameters PCP1 and the one or several predefined second power control parameters PCP2 in a memory for later uplink transmissions within one of the predefined areas AREA1, AREA2.

The steps M1/5 to M1/7 may be executed, if a new mobile station enters the predefined areas AREA1, AREA2.

In a next step M1/8, the base station BS may transmit the status information INFO-RU to the network server NS and the network server NS receives the status information INFO-RU in a further step M1/9. The step M1/8 may be performed periodically with a time period of for example minutes or hours or may be performed, if a parameter controlled or observed by the base station BS has been changed more than or equal to a predefined limit.

The status information may comprise the data traffic related information and/or the mobile station related information and/or the base station related information.

The data traffic related information may comprise for example information an amount of data traffic pending at mobile stations, which are served by the base station BS, such as a first data value in Mbit or in Gbit or a first data rate in kBit/s or MBit/s.

Alternatively or additionally, the data traffic related information may comprise information such as QCIs (QCI=QoS class indicator), which tells the receiver, which mobile station applies or wants to apply which service type or QoS class (QoS=Quality of Service) such as FTP (FTP=file transfer protocol), VoIP (VoIP=Voice over Internet Protocol) or video upload for the pending data traffic.

The mobile station related information may comprise information of a velocity of the mobile station MS, which may be determined at the base station BS for example via a Doppler shift (also called Doppler spread) by using for example following well-known equation:

$$v_{rel} = -\frac{\Delta f}{f_0} \cdot c \quad (5)$$

where:
$v_{rel}$: relative velocity between the base station BS and the mobile station MS,
$\Delta f$: frequency shift measured at the base station BS for an uplink signal transmitted by the mobile station MS,
$f_0$: frequency of the uplink signal as transmitted by the mobile station MS,
c: propagation speed of the transmitted uplink signal.

In an alternative, the velocity of the mobile station MS may be measured at the mobile station MS for example with a GPS receiver (GPS=Global Positioning System) and the information of the velocity may be transmitted from the mobile station MS to the base station BS. The information of the velocity may be provided in absolute values or by one of for example three indications for low velocity, medium velocity or high velocity. A low velocity range may be for example given by velocities from 0 to 10 km/h, a medium velocity range may be for example given by velocities from 10 km/h to 60 km/h and a high velocity range may be for example given for velocities above 60 km/h.

Alternatively or additionally, the mobile station related information may further comprise information of a power headroom of the mobile station MS. The power headroom may be for example calculated by following equation:

$$PH_c(i) = P_{CMAX,c}(i) - (P_{0\_PUSCH,c}(j) + \alpha_c(j) \cdot PL_c + 10 \log_{10}(M_{PUSCH,c}(i)) + \Delta_{TF,c}(i) + f_c(i)) \quad (6)$$

where:
$PH_c(i)$: power headroom of the mobile station.

The power headroom may be a measure of a difference between the configured maximum transmit power $P_{CMAX,c}(i)$ and an actual uplink transmission power. Preferably, the power headroom may be a measure of a difference between the configured maximum transmit power $P_{CMAX,c}(i)$ and an uplink transmit power that would have been used assuming, that the mobile station MS would not have been limited by its configured maximum transmit power $P_{CMAX,c}(i)$.

Alternatively or additionally, the mobile station related information may further comprise information of SINRs of uplink signals of the mobile stations MS1, MS2 received at the base stations BS1 to BS3.

The base station related information may comprise information of a remaining processing capacity at the base station BS for processing further uplink data of transmissions in the uplink CoMP mode. Such information may be provided for example by a second data rate in Mbit/s.

Alternatively or additionally, the base station related information may further comprise information of traffic capacity on one or several backhaul interfaces of the base station BS to neighbouring base stations. Such information may be provided for example by one or several third data rates in Gbit/s for the respective backhaul interfaces. The third base station BS3 may transmit for example one third data rate for its backhaul interface towards the first base station BS1 and another third data rate for its backhaul interface towards the second base station BS2 (see FIG. 1).

Alternatively or additionally, the base station related information may further comprise information of a predicted performance gain at the base station BS, if a ratio of a first size of the one or several first radio resources and a second size of the one or several second radio resources would be changed. The predicted performance gain at the base station BS may be given as an absolute value for example in Mbit/s. The information of the predicted performance gain may comprise a value for the predicted performance gain and a value for the first size providing the predicted performance gain and/or a value for the second size providing the predicted performance gain.

Alternatively or additionally, the base station related information may further comprise information of a current capacity utilization of the one or several first radio resources and/or the one or several second radio resources at the base station BS. The information of the current capacity utilization may be provided for example by percentage values.

In a further step M1/10, the network server NS such as the first network server NS1 determines, which of the radio cells BS1-C1-BS1-C2, BS1-C3, BS2-C1, BS2-C2, BS3-C1 and BS3-C2 may be grouped to form a cooperation area, which comprises one or several CoMP clusters. A selection of the radio cells may be based for example on following algorithm:

In a first sub-step, the QCIs are used to classify for each of the radio cells BS1-C1, BS1-C2, BS1-C3, BS2-C1, BS2-C2, BS3-C1 and BS3-C2 the mobile stations MS1, MS2 into potential CoMP users and potential non-CoMP users. A non-CoMP user is a mobile station, which applies only single-point to single-point transmissions.

If the QCIs indicate for example services with a low latency requirement or a low data rate such as VoIP or gaming, mobile stations using these services will be classified as potential non-CoMP users and will be assigned to a user list of potential non-CoMP users. If the QCIs indicate for example further services with no low latency requirement or a high data rate such as video download or web browsing, further mobile stations using these further services will be classified as potential CoMP users and will be assigned to a further user list of potential CoMP users.

In a second sub-step, first potential CoMP users with a velocity above a predefined velocity threshold such as 60 km/h may be preferably excluded from the list of potential CoMP users.

In a third sub-step, second potential CoMP users with a pending data traffic below a predefined data threshold such as 500 kbit may be preferably also excluded from the list of potential CoMP users.

In a fourth sub-step, third potential CoMP users with an SINR above a predefined SINR threshold such as 20 dB may be preferably also excluded from the list of potential CoMP users. The fourth sub-step may be discarded or the predefined SINR threshold may be set to an SINR value, which corresponds to a highest transport format such as 22 dB for example for a code rate of 0.9 and 64 QAM (QAM=quadrature amplitude modulation in case of 3GPP LTE. In such a case transmissions with a multipoint transmitter or a multipoint receiver can be also provided to mobile stations, which are located in a centre of a radio cell.

In a fifth sub-step, it is checked, whether a number of mobile stations in the list of potential CoMP users is equal to or above a predefined threshold such as for example 3. If the predefined threshold is obtained, the algorithm may be continued by sub-step six or else the algorithm is ended.

In a sixth sub-step, a resource ratio for each of the radio cells BS1-C1, BS1-C2, BS1-C3, BS2-C1, BS2-C2, BS3-C1 and BS3-C2 between the potential CoMP users and a total volume of the potential CoMP users and the potential non-CoMP users may be estimated based on the information of the pending data traffic of the potential CoMP users and based on the information of the pending data traffic of the potential non-CoMP users by using for example following equation:

$$RR_{rc} = \frac{\sum_{k \in CUL_{rc}} PDT_k}{\sum_{k \in CUL_{rc}} PDT_k + \sum_{k \notin CUL_{rc}} PDT_k} \quad (7)$$

where:
$RR_{rc}$: ratio of potential CoMP radio resources to a total volume of potential CoMP radio resources and non-CoMP radio resources in a radio cell with index rc,
k: mobile station with index k,
$CUL_{rc}$: list of potential CoMP users of radio cell with index rc,
$PDT_k$: pending data traffic of mobile station with index k In a seventh sub-step, a radio cell with a highest resource ratio $RR_{rc,max}$ may be identified and a resource ratio threshold $\Delta RR$ may be predefined by using for example following equation:

$$\Delta RR = 0.5 \cdot RR_{rc,max} \quad (8)$$

All neighbouring radio cells of the radio cell with the highest resource ratio with a resource ratio below the predefined resource ratio threshold may be for example excluded from the cooperation area and all further direct or indirect neighbouring radio cells with a resource ratio equal to or above the predefined resource ratio threshold may be assigned to or selected for the cooperation area. Indirect neighbouring radio cells have no direct border to the radio cell with the highest resource ratio. Preferably, neighbouring radio cells of the radio cell with the highest resource ratio are selected in such a way, that the cooperation area is a contiguous area and a round or hexagonal area. Thereby, a length of a border to neighbouring cooperation areas can be restricted.

Exemplarily, the network server NS has selected the first radio cell BS1-C1 of the first base station BS1 and the first radio cell BS3-C1 of the third base station BS3 to form the first cooperation area CA1.

As soon as the cooperation area has been determined, the network server NS further determines a first size for the one or several first radio resources of the cooperative multipoint transmission mode and/or the uplink CoMP transmission mode for example by applying following equation:

$$\overline{RR_{CoMP}} = \left\lceil \frac{1}{n} \sum_{m \in CA} RR_m \cdot N_{PRB} \right\rceil \quad (9)$$

where:
$\overline{RR_{CoMP}}$: rounded up number of PRBs (PRB=physical resource block) of a single uplink frame required for the cooperative multipoint transmission mode in the first cooperation area CA1,
n: number of radio cells of the first cooperation area CA1,
m: radio cell of the first cooperation area CA1 with index m
$RR_m$: resource ratio of the radio cell with the index m,
$N_{PRB}$: number of PRBs of a single uplink frame.

The network server NS further determines a second size for the one or several second radio resources of the one or several uplink single-point to single-point transmissions for example by applying following equation:

$$\overline{RR}_{\text{NoN-CoMP}} = N_{PRB} - \overline{RR}_{\text{CoMP}} \tag{10}$$

where:

$\overline{RR}_{NoN\text{-}CoMP}$: number of PRBs of a single uplink frame required for the single-point to single-point transmissions in the first cooperation area CA1.

In a next step M1/11, the network server NS reserves for the first cooperation area CA1 one or several first radio resources of for example the radio channel RC for the uplink CoMP transmission mode and further reserves for the first cooperation area CA1 one or several second radio resources of the radio channel RC for uplink single-point to single-point transmissions with a distribution depending on the first size and the second size, which have been calculated by the equations (9) and (10).

FIG. 3 a) shows a first example for such a reservation if a TDM transmission scheme (TDM=Time Division Multiplexing) may be applied in a specific frequency range, which may be assigned to a network operator.

FIG. 3 a) shows a first transmission frame F1, which is split temporal for example into 10 sub-frames S1-F1, S2-F1, S3-F1, S4-F1, S5-F1, S6-F1, S7-F1, S8-F1, S9-F1, S10-F1 and shows also partly a second transmission frame F2 with a first sub-frame S1-F2 from a group of 10 further sub-frames. A time length of the first transmission frame F1 and the second transmission frame F2 may be for example 10 ms, following from a time length of for example 1 ms for each one of the sub-frames S1-F1 to S10-F1 and S1-F2. Exemplarily, sub-frames S1-F1, S2-F1, S3-F1 and sub-frames S9-F1, S10-F1 of the first transmission frame F1 may be reserved for the uplink CoMP transmission mode and central sub-frames S4-F1, S5-F1, S6-F1, S7-F1, S8-F1 of the first transmission frame F1 may be reserved for the one or several uplink single-point to single-point transmissions. Preferably, sub-frames of the second transmission frame F2 and further transmission frames are equally reserved for the uplink CoMP transmission mode and the single-point to single-point transmissions for a predefined time or until a new radio resource reservation based on the step M1/11 is performed.

FIG. 3 b) shows a second example for such a reservation if an FDM transmission scheme (FDM=Frequency Division Multiplexing) such as used in IEEE 802.16 WiMax is applied for the uplink channel RC. FIG. 3 b) shows a first transmission frame Fib, which is split temporal for example into 10 sub-frames S1-F1b, S2-F1b, S3-F1b, S4-F1b, S5-F1b, S6-F1b, S7-F1b, S8-F1b, S9-F1b, S10-F1b and shows also partly a second transmission frame F2b with a first sub-frame S1-F2b from a group of 10 further sub-frames. A total bandwidth TB1 of for example 20 MHz of the first transmission frame F1b may be split spectral into a first bandwidth BW1, a second bandwidth BW2 and a third bandwidth BW3 preferably over a whole time length of the first transmission frame F1b. Alternatively, the total bandwidth TB1 may be for example 1.25 MHz, 3.5 MHz, 5 MHz, 7 MHz, 8.75 MHz or 10 MHz.

Exemplarily, the second bandwidth BW2 and thereby radio resource units S1-F1b-BW2 to S2-F1b-BW2 of the first transmission frame F1b such as shown in FIG. 3 b) may be reserved for the uplink CoMP transmission mode and the first bandwidth BW1 and the third bandwidth BW3 and thereby radio resource units S1-F1b-BW1 to S2-F1b-BW1 and S1-F1b-BW3 to S2-F1b-BW3 of the first transmission frame F1b may be reserved for the one or several uplink single-point to single-point transmissions. Preferably, bandwidths of the second transmission frame F2 and further transmission frames are equally reserved for the uplink CoMP transmission mode and the single-point to single-point transmissions for a predefined time or until a new radio resource reservation based on the step M1/11 is performed.

FIG. 4 shows a third example for such a reservation if an OFDMA transmission scheme (OFDMA=Orthogonal Frequency Division Multiple Access) such as used in 3GPP LTE or 3GPP LTE Advanced is applied for the uplink channel RC. FIG. 3 c) shows a first transmission frame F1c, which is split temporal for example into 10 sub-frames S1-F1c, S2-F1c, S3-F1c, S4-F1c, S5-F1c, S6-F1c, S7-F1c, S8-F1c, S9-F1c, S10-F1c and shows also partly a second transmission frame F2c with a first sub-frame S1-F2c from a group of 10 further sub-frames. A time length of the first transmission frame F1c and the second transmission frame F2c may be for example 10 ms, following from a time length of 1 ms for each one of the sub-frames S1-F1c to S10-F1c and S1-F2c, A total bandwidth TB2 of the first transmission frame F1c may be for example 4, 5 MHz by applying 25 adjacent PRBs with 12 subcarriers per PRB and a subcarrier spacing of 15 kHz. The total bandwidth TB2 may be split spectral into a first bandwidth BW1c of for example 1.44 MHz (8 adjacent PRBs), a second bandwidth BW2c of for example 2.34 MHz (13 adjacent PRBs) and a third bandwidth BW3c of for example 1.08 MHz (6 adjacent PRBs) preferably over a whole time length of the first transmission frame F1c. The first bandwidth BW1c may comprise for example 8 PRBs (PRB=physical resource block) with 12 subcarriers and a subcarrier spacing of 15 kHz such as applied in 3GPP LTE. Similarly, the second bandwidth BW2c may comprise 13 PRBs and the third bandwidth BW3c may comprise 6 PRBs.

Exemplarily, radio resource units S5-F1c-BW1c to S9-F1c-BW1c of the first bandwidth BW1c, further radio resource units S1-F1c-BW2c, S2-F1c-BW2c and S6-F1c-BW2c to S10-F1c-BW2c of the second bandwidth BW2c and even further radio resource units S1-F1c-BW3 to S3-F1c-BW3c and S8-F1c-BW3c to S10-F1c-BW3c of the third bandwidth BW3c of the first transmission frame F1c may be reserved for the uplink CoMP transmission mode. Remaining subframes of the first frame F1c may be reserved for the uplink single-point to single-point transmissions. Preferably, bandwidths and subframes of the second transmission frame F2 and further transmission frames are equally reserved for the uplink CoMP transmission mode and the uplink single-point to single-point transmission for a predefined time or until a new radio resource reservation based on the step M1/11 is performed.

In a further step M1/12, the network server NS1 transmits information INFO-RR1 of the reserved one or several first radio resources and further information INFO-RR2 of the reserved one or several second radio resources to the first base station BS1 and the third base station BS3 serving the first cooperation area CA1 and the first base station BS1 and the third base station BS3 as the base station BS receive the information INFO-RR1 and the further information INFO-RR2 in a next step M1/13.

The information INFO-RR1 comprises information, which of the PRBs and which of the sub-frames of the following frame, of a predefined number of following frames, or of an undefined number of following frames are reserved for the uplink CoMP transmission mode.

The information INFO-RR2 comprises information, which of the PRBs and which of the sub-frames of the following frame, of the predefined number of following frames, or of the undefined number of following frames are reserved for the uplink single-point to single-point transmissions.

In an alternative, only the information INFO-RR1 or the information INFO-RR2 may be transmitted to the first base station BS1 and the third base station BS3 and the first base station BS1 and the third base station BS3 deduce the other information from the received information because of the complementary usage of the radio resources for the uplink CoMP transmission mode and the uplink single-point to single-point transmissions.

If the algorithm for reserving the radio resources has been ended in the sub-step five as described above, instead of the information INFO-RR1 and/or the information INFO-RR2 an information RESET may be transmitted from the first network server NS1 to the base station BS for cancelling the reservation of the one or several first radio resources and the one or several second radio resources at the base station BS.

The steps M1/10 to M1/13 may be performed periodically or may be performed, if one of the parameters included in the information INFO-RU has been changed by a predefined amount that requires determining a new reservation for the one or several first radio resources and the one or several second radio resources.

In a further step M1/14, the base station BS transmits a third indication IND3 to the mobile station MS, which indicates one or several of the at least one first radio resource or the at least one second radio resource for an uplink transmission. The mobile station MS receives the third indication IND3 in a next step M1/15.

The third indication IND3, which may be for example a so-called uplink resource grant, tells the mobile station MS, by which PRBs and by which sub-frames of one or several next frames, the mobile station MS is allowed to transmit uplink data either by the uplink CoMP transmission mode to the base stations BS1, BS3 or by a single-point to single-point transmission to either the first base station BS1 or the third base station BS3.

Alternatively, the uplink resource grant, which comprises the third indication IND3 may further comprise the one or several predefined first power control parameters PCP1 or the one or several predefined second power control parameters PCP2. This alternative may be for example applied, if the one or several predefined first power control parameters PCP1 or the one or several predefined second power control parameters PCP2 have been changed but a broadcast for this change has not been performed yet.

In a further step M1/16, the mobile station MS applies the predefined at least one first power control parameter for the indicated at least one first radio resource or applies the predefined at least one second power control parameter for the indicated at least one second radio resource.

Figure 5:
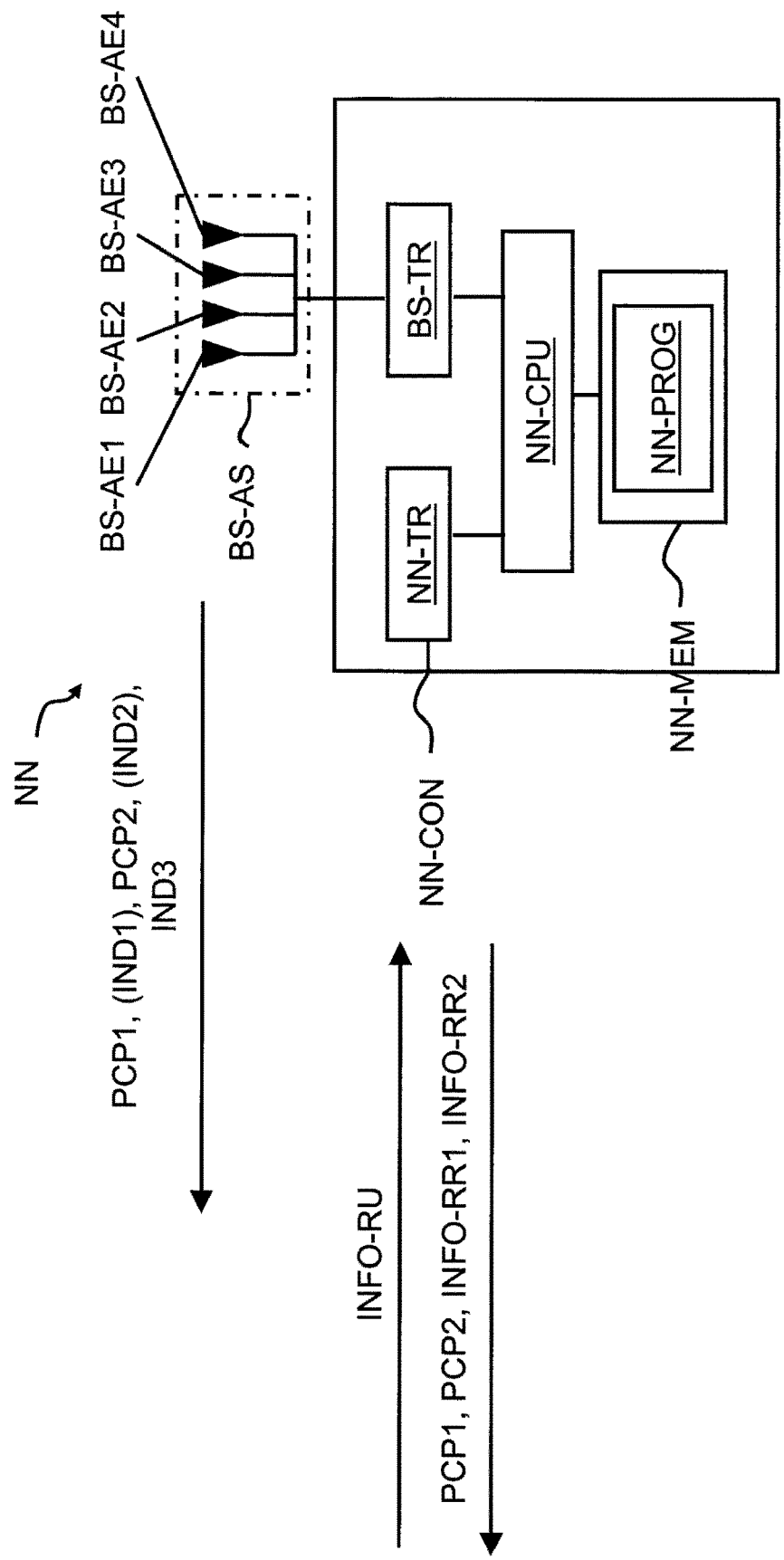
FIG. 5 shows schematically a block diagram of a network node for use in the radio communication system.

Referring to FIG. 5 a block diagram of the network node NN is shown. The network node NN may be for example a base station such as one of the base stations BS1, BS2, BS3 and BS4 shown in FIG. 1 or a network server such as one of the network servers NS1, NS2 also shown in FIG. 1.

The network node NN may comprise a first transceiver NN-TR, a connection NN-CON for connecting the first transceiver NN-TR for example with a transmission line such as a fixed line, a CPU NN-CPU (CPU=central processing unit) connected to the first transceiver NN-TR, and a computer readable medium NN-MEM connected to the CPU NN-CPU. The computer readable medium NN-MEM such as a hard disc may store a computer readable program MS-PROG. The CPU NN-CPU is foreseen for executing the computer readable program NN-PROG. The computer readable program NN-PROG is foreseen for executing steps of the method MET relating to the network node NN and may store the information INFO-RU received from one of the base stations BS1, BS2, BS3, BS4, may store the one or several predefined first power control parameters PCP1 and the one or several predefined second power control parameters PCP2 to be applied in the first and/or the second predefined area AREA1, and may store the resource reservation of the one or several first radio resources and the one or several second radio resources to be applied in the first cooperation area CA1.

The first transceiver NN-TR may receive the information INFO-RU from one or several of the base stations BS1, BS2, BS3, BS4 and may transmit the one or several predefined first power control parameters PCP1, the one or several predefined second power control parameters PCP2, the information INFO-RR1 and the information INFO-RR2 to one or several of the base stations BS1, BS2, BS3, BS4.

If the network node NN is a base station, the network node NN may further comprise an antenna system BS-AS and a second transceiver unit BS-TR connected to the antenna system BS-AS and connected to the CPU NN-CPU. The antenna system BS-AS may comprise four antenna elements BS-AE1, BS-AE2, BS-AE3, BS-AE4. In further alternatives, the antenna system BS-AS may comprise only one antenna element, two antenna elements or more than four antenna elements. The antenna system BS-AS and the second transceiver unit BS-TR may transmit the one or several predefined first power control parameters PCP1, the one or several predefined second power control parameters PCP2 and the third indication IND3 to one or several of the mobile stations MS1, MS2. Alternatively, the antenna system BS-AS and the second transceiver unit BS-TR may further transmit the first indication IND1 and the second indication IND2 to the mobile stations MS1, MS2.

Figure 6:
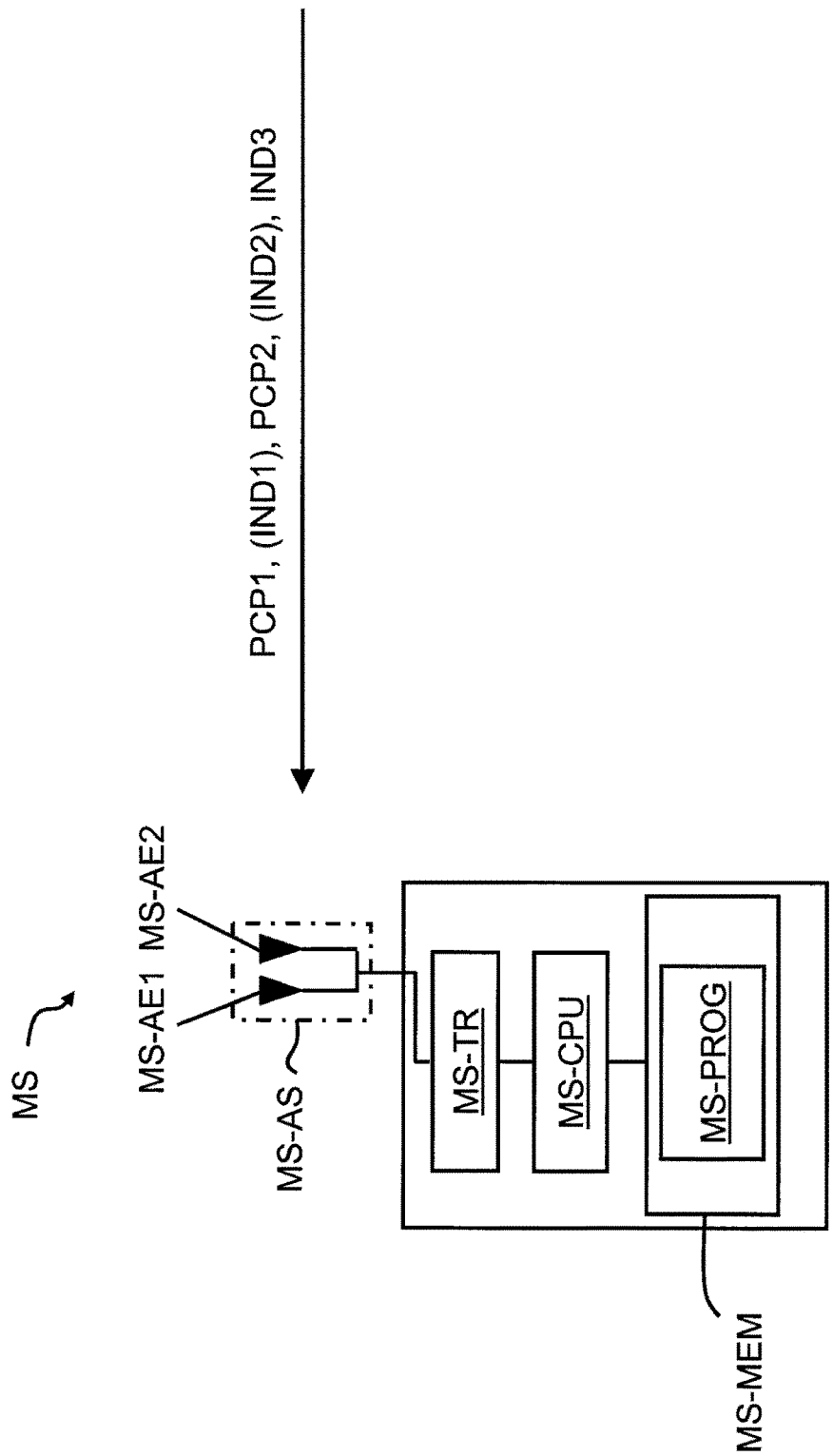
FIG. 6 shows schematically a block diagram of a mobile station for use in the radio communication system.

Referring to FIG. 6 a block diagram of the mobile station MS is shown. The mobile station MS may comprise an antenna system MS-AS, a transceiver MS-TR connected to the antenna system MS-AS, a CPU MS-CPU (CPU=central processing unit) connected to the transceiver MS-TR, and a computer readable medium MS-MEM connected to the CPU MS-CPU.

The antenna system MS-AS may comprise a first antenna element MS-AE1 and a second antenna element MS-AE2. According to further alternatives, the antenna system MS-AS may comprise a single antenna element or more than two antenna elements.

The computer readable medium MS-MEM such as a flash memory may store a computer readable program MS-PROG. The CPU MS-CPU is foreseen for executing the computer readable program MS-PROG. The computer readable program MS-PROG is foreseen for executing steps of the method MET relating to the mobile station MS and may store the one or several predefined first power control parameters PCP1 for future transmissions in the uplink CoMP transmission mode and the one or several predefined second power control parameters PCP2 for future single-point to single-point transmissions.

The transceiver MS-TR and the antenna system MS-AS may receive the one or several predefined first power control parameters PCP1 and the one or several predefined second power control parameters PCP2. Alternatively, the transceiver MS-TR and the antenna system MS-AS may further receive the first indication IND1 and the second indication IND2.

A person of skill in the art would readily recognize that method steps of the above-described embodiments can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as " . . . unit" or "means for . . . " shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks may be provided through the use of dedicated hardware as well as the through the use of hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for coordinating at least one first uplink transmission from mobile stations to a multipoint receiver comprising at least two antenna systems of a radio communication system and at least one second uplink transmission from said mobile stations to a single-point receiver being a single antenna system of said radio communication system, said method comprising reserving at least one first radio resource for said at least one first uplink transmission for at least two serving areas of said radio communication system and further reserving at least one second radio resource for said at least one second uplink transmission for said at least two serving areas,
   wherein said method further comprises:
      predefining at least one first power control parameter for said at least one first uplink transmission,
      predefining at least one second power control parameter for said at least one second uplink transmission,
      transmitting said predefined at least one first power control parameter and said predefined at least one second power control parameter to at least one of said mobile stations,
      storing said predefined at least one first power control parameter and said predefined at least one second power control parameter at said at least one of said mobile stations,
      transmitting an indication indicating said at least one first radio resource or said at least one second radio resource to said at least one of said mobile stations, and
      applying at said at least one of said mobile stations said predefined at least one first power control parameter for said at least one first radio resource or said predefined at least one second power control parameter for said at least one second radio resource based on said received indication.

2. The method according to claim 1, wherein said method further comprises:
   receiving from at least one base station of said radio communication system status information of said at least one base station,
   determining a size of said at least one first radio resource for said at least first uplink transmission, a size of said at least one second radio resource for said at least one second uplink transmission, and a cooperation area comprising said at least two serving areas based on said received status information, and
   transmitting radio resource information of at least one of said reserved at least one first radio resource or of said reserved at least one second radio resource to said at least one base station serving said cooperation area.

3. The method according to claim 1, wherein said predefined at least one first power control parameter and said predefined at least one second power control parameter are transmitted in a broadcast.

4. The method according to claim 1, wherein said indication is an uplink resource grant.

5. The method according to claim 1, wherein one of said predefined at least one first power control parameter and said predefined at least one second power control parameter are transmitted as an absolute value and wherein a further one of said predefined at least one first power control parameter and said predefined at least one second power control parameter is transmitted as a difference value with respect to said absolute value.

6. The method according to claim 2, wherein said status information comprises data traffic related information and/or mobile station related information and/or base station related information.

7. The method according to claim 6, wherein said data traffic related information comprises information of an amount of data traffic pending at at least one of said mobile stations and/or information of at least one quality of service type of said pending traffic.

8. The method according to claim 6, wherein said mobile station related information comprises information of velocity of at least one of said mobile stations and/or information of a signal-to-interference and noise ratio of uplink signals received from said at least one of said mobile stations and/or information of power headroom of said at least one of said mobile stations.

9. The method according to claim 6, wherein said base station related information comprises information of remaining processing capacity at said at least one base station for said at least one first uplink transmission and/or information of traffic capacity on at least one backhaul interface of said at least one base station and/or information of a predicted performance gain at said at least one base station, if a ratio of said size of said at least one first radio resource and said size of said at least one second radio resource would be changed and/or information of a current capacity utilization of said at least one first radio resource and/or said at least one second radio resource at said at least one base station.

10. The method according to claim 6, wherein said reservation of said at least one first radio resource and said reservation of said at least one second radio resource is performed, if a number of said mobile stations applying said at least one first uplink transmission exceeds a predefined threshold.

11. A network node for coordinating at least one first uplink transmission from mobile stations to a multipoint receiver comprising at least two antenna systems of a radio communication system and at least one second uplink transmission from said mobile stations to a single-point receiver being a single antenna system of said radio communication system, said network node comprising a processor configured to:
reserve at least one first radio resource for said at least one first uplink transmission for at least two serving areas of said radio communication system and further reserve at least one second radio resource for said at least one second uplink transmission for said at least two serving areas, and
predefine at least one first power control parameter for said at least one first uplink transmission and at least one second power control parameter for said at least one second uplink transmission, and
a transmitter configured to transmit said predefined at least one first power control parameter, said predefined at least one second power control parameter and an indication indicating said at least one first radio resource or said at least one second radio resource to at least one of said mobile stations.

12. The network node according to claim 11, wherein said network node is a base station or a network server.

13. A mobile station for use in a radio communication system, said mobile station comprising:
a receiver configured to:
receive a predefined at least one first power control parameter for at least one first uplink transmission from said mobile station to a multipoint receiver comprising at least two antenna systems of said radio communication system,
receive a predefined at least one second power control parameter for at least one second uplink transmission from said mobile station to a single-point receiver being a single antenna system of said radio communication system, and
receive an indication indicating at least one first radio resource reserved for said at least one first uplink transmission or indicating at least one second radio resource reserved for said at least one second uplink transmission,
a non-transitory computer-readable medium configured to store said predefined at least one first power control parameter and said predefined at least one second power control parameter, and
a processor configured to apply said predefined at least one first power control parameter for said at least one first radio resource or said predefined at least one second power control parameter for said at least one second radio resource based on said received indication.

14. The mobile station according to claim 13, wherein said mobile station is a cellular telephone, a portable computer, a pocket computer, a hand-held computer, a personal digital assistant or a car-mounted mobile device.

* * * * *